(12) United States Patent
Ou

(10) Patent No.: US 10,492,525 B2
(45) Date of Patent: Dec. 3, 2019

(54) METHOD OF MAKING A DISPOSABLE VIAL FOR PACKING TOBACCO TO BE SMOKED

(71) Applicant: Pacific Vial Mfg., Inc., Commerce, CA (US)

(72) Inventor: Suk Hwan Ou, Commerce, CA (US)

(73) Assignee: R.Y.L. INC., Commerce, CA (US)

(*) Notice: Subject to any disclaimer, the term of this patent is extended or adjusted under 35 U.S.C. 154(b) by 0 days.

(21) Appl. No.: 15/593,242

(22) Filed: May 11, 2017

(65) Prior Publication Data

US 2017/0238604 A1 Aug. 24, 2017

Related U.S. Application Data

(60) Division of application No. 15/417,010, filed on Jan. 26, 2017, which is a continuation of application No. 15/003,442, filed on Jan. 21, 2016.

(51) Int. Cl.
*A24F 1/32* (2006.01)
*A24F 1/28* (2006.01)
(Continued)

(52) U.S. Cl.
CPC ............ *A24F 1/32* (2013.01); *A24F 1/28* (2013.01); *A24F 5/10* (2013.01); *C03B 23/049* (2013.01);
(Continued)

(58) Field of Classification Search
CPC . C03B 23/043; C03B 23/045; C03B 23/0473; C03B 23/0493; A24F 1/32; A24F 1/28
See application file for complete search history.

(56) References Cited

U.S. PATENT DOCUMENTS

| 1,948,560 A | 2/1934 | Borneman |
| 4,516,998 A | 5/1985 | Ritt et al. |

(Continued)

FOREIGN PATENT DOCUMENTS

| CA | 2271404 | 11/2000 |
| EP | 0295104 A1 | 12/1988 |

(Continued)

OTHER PUBLICATIONS

Pacific Vial MFG., Inc., International Search Report and Written Opinion dated Apr. 18, 2017, Application No. PCT/US2017/014185.

(Continued)

*Primary Examiner* — Michael H. Wilson
*Assistant Examiner* — Dionne W Mayes
(74) *Attorney, Agent, or Firm* — Womble Bond Dickinson (US) LLP

(57) ABSTRACT

A vial for packing a substance to be smoked from the vial and a method of manufacturing the vial, the method of manufacturing including providing a glass vial, the glass vial having a first end portion and a second end portion connected by a tubular portion having a hollow interior, the first end portion being open and the second end portion being closed; applying heat to a section of the tubular portion to heat the section of the tubular portion; applying a pressure around the heated section of the tubular portion to collapse the section of the tubular portion into the hollow interior of the tubular portion; pressing the first end portion and the second end portion together until an exterior surface of the tubular portion surrounding the collapsed section is level with a remaining exterior surface of the tubular portion; and forming an opening in the second end portion.

12 Claims, 5 Drawing Sheets

(51) Int. Cl.
  *A24F 5/10* (2006.01)
  *C03B 23/18* (2006.01)
  *C03B 23/049* (2006.01)
  *C03B 23/09* (2006.01)
  *C03B 33/085* (2006.01)
  *A24F 47/00* (2006.01)

(52) U.S. Cl.
  CPC .......... *C03B 23/097* (2013.01); *C03B 23/18* (2013.01); *C03B 33/085* (2013.01); *A24F 47/004* (2013.01)

(56) References Cited

U.S. PATENT DOCUMENTS

| | | | |
|---|---|---|---|
| 4,923,498 | A | 5/1990 | Gregory |
| 5,167,420 | A | 12/1992 | Gregory et al. |
| D357,985 | S | 5/1995 | Burns |
| 6,148,826 | A * | 11/2000 | Lancaster et al. ........ A24F 1/00 131/191 |
| D445,908 | S | 7/2001 | Conway |
| D447,812 | S | 9/2001 | Conway |
| 6,640,587 | B1 | 11/2003 | Hollesen et al. |
| 7,415,982 | B1 | 8/2008 | Sheridan |
| 7,845,358 | B2 | 12/2010 | Danforth |
| 8,967,153 | B2 | 3/2015 | Hoang et al. |
| D730,735 | S | 6/2015 | Sommer |
| D755,957 | S | 5/2016 | Larson |
| D774,247 | S | 12/2016 | Chen |
| D810,355 | S | 2/2018 | Liu |
| D814,103 | S | 3/2018 | Levinson |
| 2002/0135305 | A1 | 9/2002 | Horiuchi et al. |
| 2008/0271744 | A1* | 11/2008 | Danforth ................... A24F 1/28 131/270 |
| 2009/0061723 | A1 | 3/2009 | Lee et al. |
| 2010/0218778 | A1* | 9/2010 | Borden ..................... A24F 1/02 131/194 |
| 2014/0158143 | A1 | 6/2014 | Barrett |
| 2014/0360513 | A1 | 12/2014 | Morgan |
| 2015/0197443 | A1 | 7/2015 | Voelkl et al. |
| 2015/0336320 | A1 | 11/2015 | Poulat et al. |
| 2016/0130170 | A1 | 5/2016 | Maennl et al. |
| 2016/0244354 | A1 | 8/2016 | Segner |
| 2017/0238604 | A1 | 8/2017 | Ou |

FOREIGN PATENT DOCUMENTS

| | | |
|---|---|---|
| GB | 2096564 A | 10/1982 |
| WO | WO-2014093181 | 6/2014 |

OTHER PUBLICATIONS

Pacific Vial MFG., Inc., Notice of Allowance dated May 9, 2017, U.S. Appl. No. 15/417,010.
Notice of Allowance received for Design U.S. Appl. No. 29/606,518, dated Apr. 26, 2018, 8 pages.
Non-Final Office Action received for U.S. Appl. No. 15/417,010, dated Mar. 7, 2017, 10 pages.
Non-Final Office Action dated Jul. 16, 2018, from U.S. Appl. No. 15/003,442.
Non-Final Office Action dated Jul. 16, 2018, from U.S. Appl. No. 15/417,010.
Office Action dated Nov. 2, 2018, for related U.S. Appl. No. 15/417,010 14 Pages.
Office Action dated Dec. 10, 2018, for related U.S. Appl. No. 15/003,442 13 Pages.
Non-Final Office Action dated Apr. 12, 2019, from U.S. Appl. No. 15/003,442.
Final Office Action dated May 1, 2019, from U.S. Appl. No. 15/417,010.
Notice of Allowance, dated Aug. 21, 2019, from U.S. Appl. No. 15/003,442.
Communication pursuant to Article 94(3) EPC dated Aug. 9, 2019, from EP Application No. 17 702 272.0.
Non-Final office action dated Sep. 27, 2019, from U.S. Appl. No. 15/417,010.

* cited by examiner

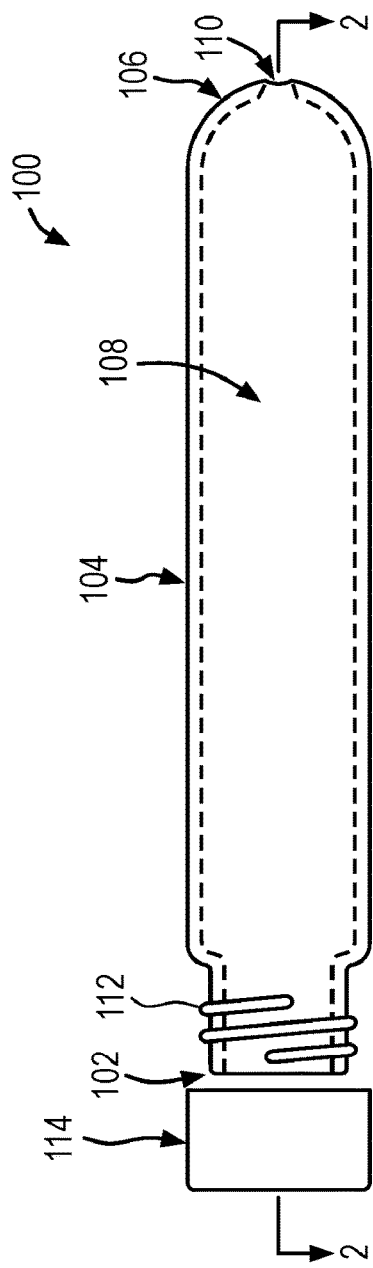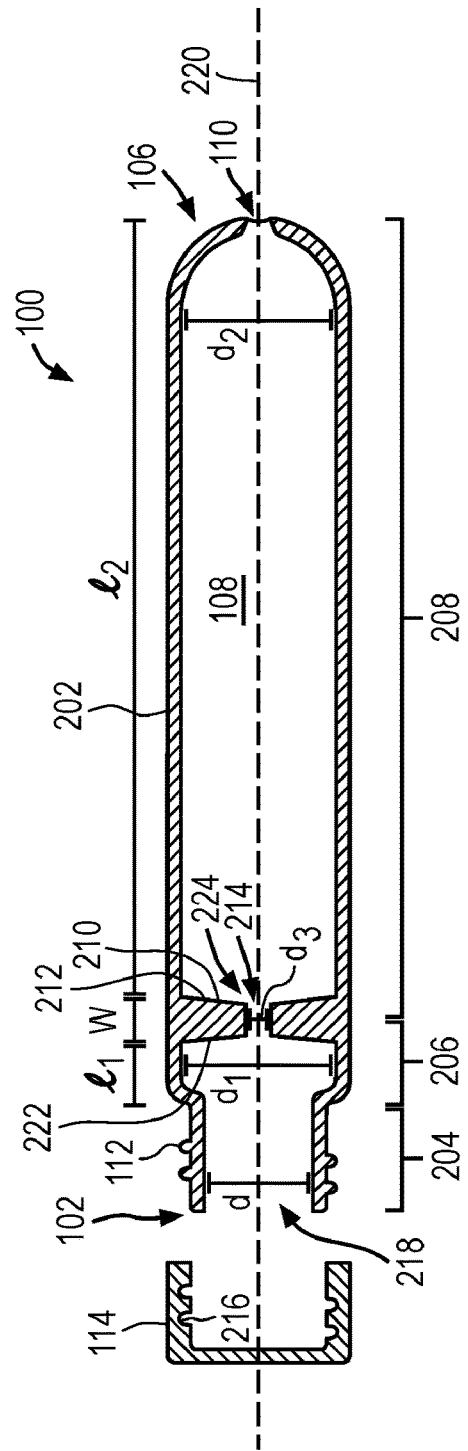

METHOD OF MAKING A DISPOSABLE VIAL FOR PACKING TOBACCO TO BE SMOKED

FIELD

An embodiment is related to a method of manufacturing a vial for use in smoking a substance from the vial. More specifically, a method of manufacturing a disposable vial within which tobacco may be packed and smoked. Other embodiments are also described.

BACKGROUND

Various devices exist for smoking substances such as tobacco. The most commonly used device is a cigarette or cigar, which consists of tobacco rolled within a thin paper. The cigarette or cigar is ignited at one end and smoke, which is emitted from the tobacco (once ignited or smoldering), is inhaled or tasted from the other end. In addition to cigarettes, there are tobacco pipes which are designed to hold tobacco in a bowl formed at one end and allow the user to inhale or taste smoke or vapor emitted from the burning or vaporization of the tobacco from another end. In particular, a tobacco pipe typically consists of an upwardly facing bowl for holding the tobacco, a stem (or shank) that extends from the bowl and ends in a mouth piece (the bit). Cigarettes and cigars are disposable, while most tobacco pipes are not.

SUMMARY

The instant invention is directed to a process of manufacturing a disposable vial for packing a substance (e.g. tobacco) to be smoked from the vial. The process may include heating a section of a vial (e.g. a glass vial). The vial should be rotating at anywhere from 30 revolutions per minute (RPM) to 60 RPM during the entire process. After the vial is heated enough to manipulate it, a tool (e.g. a graphite tool) is used to press the heated section of the vial to create an hourglass shape. Once the hourglass shape is formed, the same section of the vial is again heated. While heating, both ends of the vial are pressed together until the vial walls are flush again. In other words, the sections of the wall which form an indentation in the outer surface between each side of the hourglass shape are pressed together again so that the indentation is removed. Finally, the center tip of the bottom of the vial is heated with a fine point flame while blowing into the vial until a small hole is created.

More specifically, in one embodiment, a method of manufacturing a vial for packing a substance to be smoked from the vial is provided. The method may include providing a vial which includes a first end portion and a second end portion connected by a tubular portion having a hollow interior. The first end portion may be open and the second end portion may be closed. The method further includes forming a first chamber and a second chamber within the hollow interior of the tubular portion. Still further, an opening may be formed in the second end portion. The opening in the second end portion may be an inhalation port, which is narrower than an opening in the first end portion. In one aspect, the first and second chambers may be formed by heating a portion of a wall forming the tubular portion of the vial. Once the portion of the wall is heated, an inward pressure may be applied to the portion of the wall to collapse the wall into the hollow interior of the tubular portion to form a neck portion within the hollow interior of the tubular portion. The neck portion may be dimensioned to separate the first chamber from the second chamber. In one embodiment, after forming the neck portion, heat may be applied to the portion of the wall forming the neck portion, and the first end portion and the second end portion of the vial are pushed toward one another until an exterior surface of the tubular portion circumferentially outward to the neck portion is flush with the rest of the tubular portion. The vial may be rotated while applying the heat and the pressure to the portion of the wall. In one aspect, the opening in the second end portion may be formed by heating the second end portion and introducing air into the opening in the first end portion until the opening in the second end portion is formed. In some embodiments, the vial is a screw thread glass vial, wherein the screw thread is at the first end portion.

In another embodiment, a method of manufacturing a vial for packing a substance to be smoked from the vial includes providing a glass vial that includes a first end portion and a second end portion connected by a tubular portion. The method may further include applying heat to a section of the tubular portion to heat the section of the tubular portion and applying a pressure around the heated section of the tubular portion to collapse the section of the tubular portion into the hollow interior of the tubular portion. Collapsing the tubular portion forms a neck within the hollow interior of the tubular portion. The neck may include an opening that is narrower than an opening of the first end portion. In addition, the first end portion and the second end portion are pressed together until an exterior surface of the tubular portion surrounding the collapsed section is level with a remaining exterior surface of the tubular portion. An opening may also be formed in the second end portion by applying heat to a center of the second end portion and simultaneously injecting air into the first end portion.

In another embodiment, a vial for packing a substance to be smoked from the vial is provided. The vial may include a receiving chamber having an open end dimensioned to receive a substance to be packed within the receiving chamber. The vial may further include an elongated vapor chamber extending from the receiving chamber. The elongated vapor chamber may have an inhalation port for outputting a vapor from a substance within the receiving chamber. In addition, the vial may include neck portion positioned between the receiving chamber and the elongated vapor chamber. The neck portion may have a wall extending concentrically inward from an arcuate wall forming the receiving chamber and the elongated vapor chamber. The wall may further include an opening that is axially aligned with the open end of the receiving chamber and the inhalation port of the elongated vapor chamber. In some embodiments, a diameter of the receiving chamber is equal to or less than a diameter of the elongated vapor chamber. Still further, a length of the receiving chamber may be less than a length of the elongated vapor chamber. In addition, a width of the neck portion may be less than a length of the receiving chamber and the elongated vapor chamber. In one aspect, the interior wall forming the neck portion may include a first side facing the open end of the receiving chamber and a second side facing the inhalation port. The first side may form a portion of the receiving chamber and the second side may form a portion of the elongated vapor chamber. The receiving chamber, the elongated vapor chamber and the neck portion may be integrally formed from a glass vial. A screw threading may further be formed around an outer surface of the receiving chamber. In addition, a cap dimensioned to close the open end of the receiving chamber may further be provided.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention in the interest of reducing the total number of drawings, and as a result, not all elements in the figure may be required for a given embodiment.

FIG. 1 illustrates a side view of one embodiment of a vial from which a substance may be smoked.

FIG. 2 illustrates a cross-sectional side view of the vial of FIG. 1 along line 2-2'.

DETAILED DESCRIPTION

Figure 3:
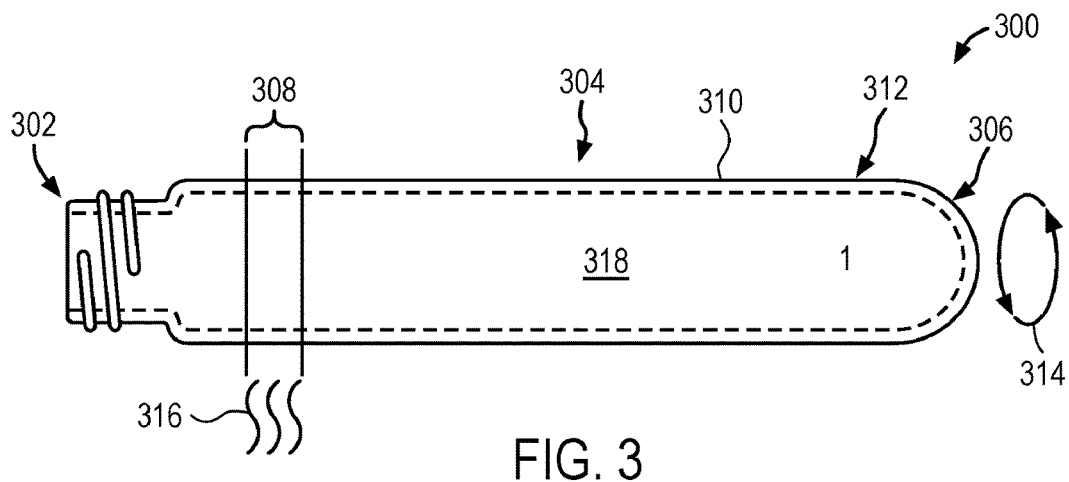
FIG. 3 illustrates a side view of one embodiment of a vial from which a vial for packing and smoking a substance may be manufactured.

Several embodiments of the invention with reference to the appended drawings are now explained. Whenever aspects of the embodiments described here are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

FIG. 1 illustrates a side view of one embodiment of a vial from which a substance may be smoked. In one embodiment, vial 100 may be a screw thread type of vial that includes a first end 102, a second end 106 and a middle portion 104 connecting the first end 102 to the second end 106. The first end 102 may be substantially open and include threading 112 around its outer or exterior surface. The threading 112 may be complimentary to threading along an inner or interior surface of optional cap 114. The second end 106 may be substantially closed except for a port 110 through which a fluid may pass. The fluid may, for example, be a vapor or gas given off by the substance (e.g. tobacco) smoked from vial 100. In addition, the second end 106 may be substantially round, as opposed to flat, such that a diameter of vial 100 at second end 106 decreases going toward port 110. The middle portion 104 may be a tubular member having a substantially hollow interior 108. The substance to be smoked (e.g. tobacco) may be packed within vial 100 by inserting it into the open first end 102 such that it is held near first end 102. Optional cap 114 may be screwed to first end 102 to help hold the substance within vial 100. During use, cap 114 is removed, and a flame is applied to first end 102 so that the substance packed is caused to burn or smolder and emit a vapor. The vapor from the burning or smolder substance then can be inhaled through the port 110 within the second end 106 by a user.

FIG. 2 illustrates a cross-sectional side view of the vial of FIG. 1 along line 2-2'. From this view, it can be seen that the substantially hollow interior 108 of vial 100, which is defined by an exterior wall 202, is divided into an end chamber 204, a first chamber 206 and a second chamber 208. The end chamber 204 may extend from the opening 218 formed in first end 102 of vial 100 to the first chamber 206. The end chamber 204 is open such that a substance can be introduced to the first chamber 206 through opening 218 and end chamber 204. In some cases, the end chamber 204 may have a diameter (d) that is the same as opening 218 yet smaller than a diameter ($d_1$) of first chamber 206 and diameter ($d_2$) of second chamber 208. Representatively, the diameter (d) of end chamber 204 may be large enough to allow a substance (e.g. tobacco) to be inserted through end chamber 204 to first chamber 206, yet smaller than first chamber 206 such that once the substance is within first chamber 206, it is prevented from falling back into end chamber 204.

The first chamber 206 may be dimensioned to receive and hold a substance (e.g. tobacco) to be smoked from vial 100. In this aspect, first chamber 206 may also be referred to herein as a receiving chamber. The second chamber 208 may be dimensioned to receive a smoke or vapor emitted from the substance within first chamber 206. In this aspect, in some embodiments, second chamber 208 may be referred to herein as a smoke or vapor chamber. The second chamber 208 may be considered an elongated chamber in that it has a length ($l_2$) that is greater than a length ($l_1$) of first chamber 206.

In order to keep a substance packed within first chamber 206 from passing into second chamber 208, the first chamber 206 and the second chamber 208 may be separated by a neck portion 210. Neck portion 210 may be formed by an interior wall 212 that extends circumferentially inward from exterior wall 202. In one aspect, the interior wall 212 may include a first side 222 facing the first chamber 206 and opening 218 of first end 102 and a second side 224 facing the port 110. In this aspect, the first side 222 may form a portion of the first chamber 206 and the second side 224 may form a portion of the second chamber 208.

Interior wall 212 may include an opening 214 of a size sufficient to allow smoke or vapor emitted from the substance within first chamber 206 to pass to second chamber 208 while still preventing the substance from passing from first chamber 206 to second chamber 208. In this aspect, in some embodiments, a diameter ($d_3$) of the opening 214 of neck portion 210 is less than a diameter ($d_1$) of first chamber 206 and a diameter ($d_2$) of second chamber 208. The diameter ($d_1$) of first chamber 206 and the diameter ($d_2$) of second chamber 208 may be substantially the same, or the diameter ($d_1$) of first chamber 206 may be less than a diameter ($d_2$) of second chamber 208. In addition, it is noted that in some embodiments, a width (w) of interior wall 212 is less than a length ($l_1$) of first chamber 206 and a length ($l_2$) of second chamber 208. In this aspect, interior wall 212 is not considered to occupy a substantial area of the hollow interior 108.

It is further noted that in some embodiments, the opening 214 of neck portion 210 is axially aligned with the opening 218 to end chamber 204 and port 110 within second end 106. In other words, each of opening 214, opening 218 and port 110 are aligned along a longitudinal axis 220 of vial 100. Said another way, the entire length of vial 100 may be substantially straight such that it is symmetrical about axis 220, and in turn, each of opening 214, opening 218 and port 110 are also symmetrical about axis 220. In addition, port 110 may have a smaller diameter than the opening 218 of end chamber 204. For example, the diameter of port 110 may be of a size suitable for allowing smoke or vapors to pass through it, but not a substance packed within first chamber 206.

It can further be seen from FIG. 2 that optional cap 114 includes threading 216 along its inner or interior surface that is complimentary to threading 112 on vial 100. In this FIG. 3 illustrates a side view of one embodiment of a vial from which a vial for packing and smoking a substance may be manufactured. Vial 312 may, for example, be a disposable screw thread glass vial such as that available from Pacific Vial Manufacturing Inc., of Commerce, Calif. The vial 312 may be considered a disposable vial in that it is intended for single use and may be disposed of by the user. Similar to the previously discussed vial 100, vial 312 may include a first end 302 and a second end 306 which are connected by a middle portion 304. Vial 312 may be rotated as shown by arrows 314 throughout all of the processing operations disclosed herein. Representatively, vial 312 may be rotated at a rate of from about 30 revolutions per minute (RPM) to about 60 RPM. Vial 312 may be rotated by inserting the vial 312 into any conventional machine operable to rotate a vial at the desired RPM. Once the vial 312 is rotating, heat 316 may be applied to a section 308 of vial 312 during processing operation 300. The heat 316 may be applied by, for example, a burner aligned with section 308 of vial 312. Heating section 308 softens the glass material of vial 312 so that the vial wall 310 may be collapsed into the hollow interior 318 of vial 312, as will be described in more detail in reference to FIG. 4. It should be noted that although specific processing parameters (e.g. rotation speed) may be disclosed herein, the parameters can vary depending upon, for example, the machine speed. For example, the heating time of the vial during any processing step disclosed herein depends on machine speed, which may be around 22 ppm, plus or minus 2. In addition, the RPM may vary in speed, for example, from 200-280 RPM depending on machine speed and desired result.

Figure 4:
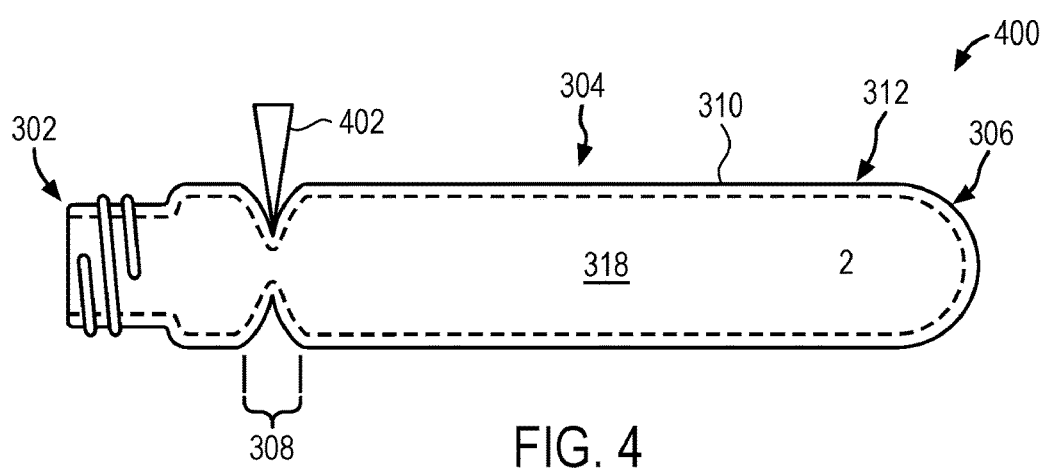
FIG. 4 illustrates the vial of FIG. 3 after the further processing operation of applying pressure to a heated section of the vial to collapse the heated section of the vial.

FIG. 4 illustrates the vial of FIG. 3 after the further processing operation of applying pressure to a heated section of the vial to collapse the heated section of the vial. In particular, in processing operation 400, a tool 402 is used to apply a pressure to the heated section 308 of vial 312. The application of heat 316 may be discontinued during operation 400. The tool 402 may be any type of relatively pointed tool suitable for applying a pointed pressure to wall 310 of vial 312. Tool 402 may be part of the machine used to heat and/or rotate vial 312. Representatively, tool 402 may be a graphite or steel tool having a pointed end that is pressed by a machine against wall 310 while vial 312 is rotating. Applying an inward pressure to wall 310 within section 308 causes wall 310 to collapse into hollow interior 318 as shown in FIG. 4. The inward pressure may depend on how soft the glass is after the heating process but, in some cases may be, for example, from about 2-4 pounds per square inch. The amount of time the pressure is applied will depend on the machine speed. The collapsed wall section is used to form a neck within interior 318, as previously discussed in reference to FIG. 2. In this aspect, the tool 402 should be used to apply a pressure sufficient to collapse wall 310 into interior 318 without completely occluding interior 318. In other words, a space or gap should remain between the interfacing surfaces of the collapsed section of wall 310 so that an opening between the first end 312 and second end 306 is maintained.

Figure 5:
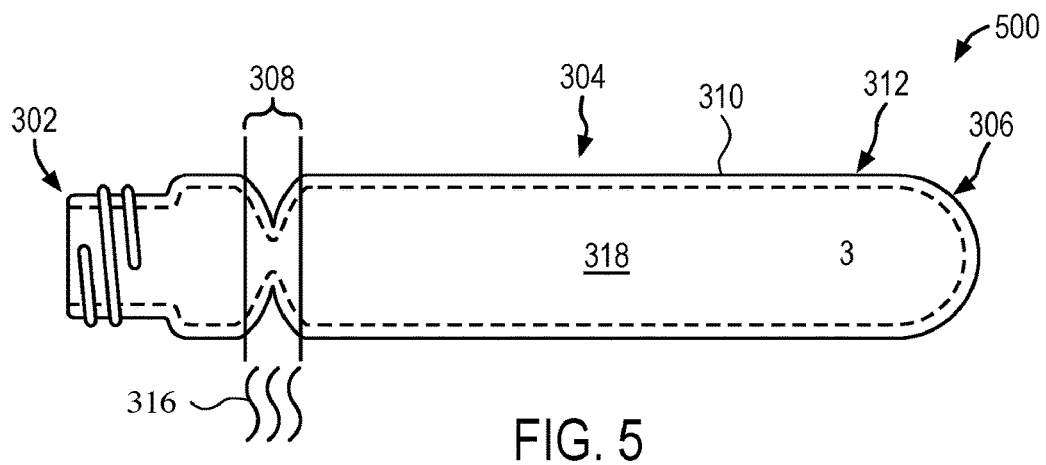
FIG. 5 illustrates the vial of FIG. 4 after the further processing operation of applying heat to the collapsed section of the vial.

FIG. 5 illustrates the vial of FIG. 4 after the further processing operation of applying heat to the collapsed section of the vial. Representatively, in processing operation 500, once the section 308 of wall 310 is collapsed into the interior 318 of vial 312, heat 316 is again applied to section 308 so that further molding of wall 310 at section 308 can occur as shown in FIG. 6.

Figure 6:
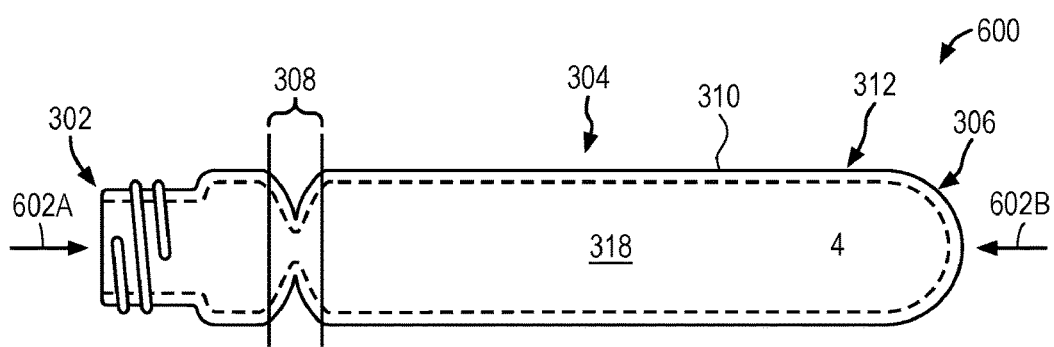
FIG. 6 illustrates the vial of FIG. 5 after the further processing operation of pressing the ends of the vial together.

FIG. 6 illustrates the vial of FIG. 5 after the further processing operation of pressing the ends of the vial together. In particular, in processing operation 600, an inward force 602A is applied against first end 302 and an inward force 602B is applied against second end 306. In this aspect, first end 302 and second end 306 are pressed toward each other. The inward forces 602A, 602B may be applied by a tool or machine associated with the previously discussed machinery that is designed to press the ends together. The tools used to press the ends together may be custom shaped steel tools attached to the machine. Again, the time and pressure will vary depending on machine speed, softness of glass, etc. First end 302 and second end 306 are pressed together until an exterior surface of the wall 310 of middle portion 304 circumferentially outward to the collapsed section is flush with the rest of the middle portion 304 as shown in FIG. 7.

Figure 7:
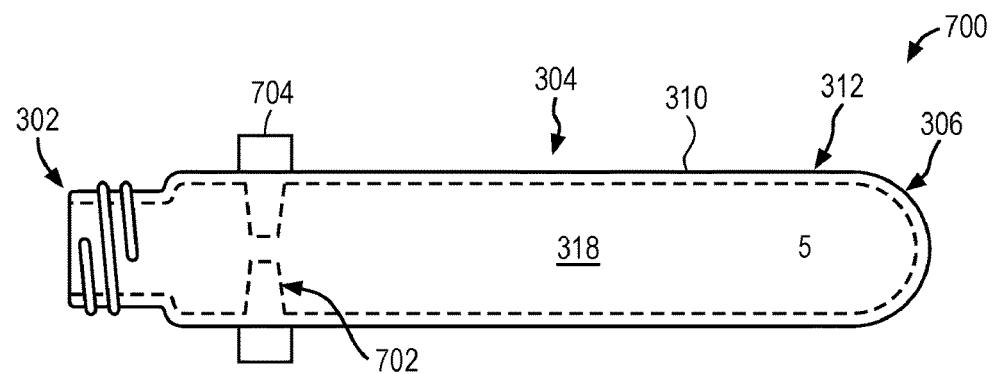
FIG. 7 illustrates the vial of FIG. 6 after the further processing operation of making the vial wall at the collapsed section flush with the rest of the vial.

FIG. 7 illustrates the vial of FIG. 6 after the further processing operation of making the vial wall at the collapsed section flush with the rest of the vial. Representatively, processing operation 700 shows the exterior surface of section 704 of wall 310, which is circumferentially outward to neck portion 702, flush with the rest of middle portion 304. In this aspect, an outer diameter of the middle portion 304 of vial 312 is the same along its length. In other words, there are no grooves, recesses or other indentations along the outer surface of middle portion 304.

Figure 8:
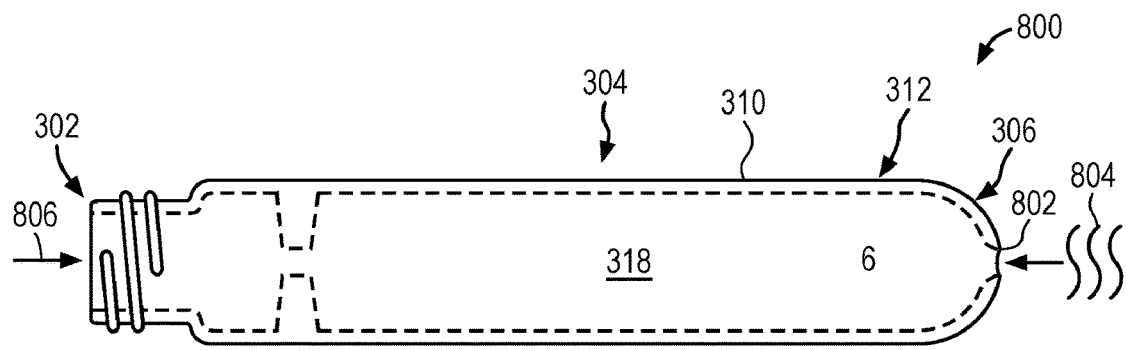
FIG. 8 illustrates the vial of FIG. 7 after the further processing operation of forming a port in the end of the vial.

FIG. 8 illustrates the vial of FIG. 7 after the further processing operation of forming a port in the end of the vial. Representatively, processing operation 800 is used to form a port 802 within the second end 306 of vial 312. In this aspect, heat 804 is applied to a center tip of second end 306 of vial 312 with a fine point flame (e.g. using a burner). Simultaneously, air is blown into the first end 302 in a direction of arrow 806 until a port 802 is formed within second end 306. The pressure from the air pushes out an opening in the softened glass of the second end 306 to form port 802. The air may be blown into first end 302 using, for example, a machine operable to output a flow of air, for example, an air compressor. The air pressure produced by the air compressor may be regulated to blow at 20-30 psi depending on machine speed, flame temperature and desired opening size. The flame may be used to heat the end of the vial throughout the entire operation 800. Once port 802 is formed, heat 804 and the air may be removed and vial 312 is allowed to cool.

Figure 9:
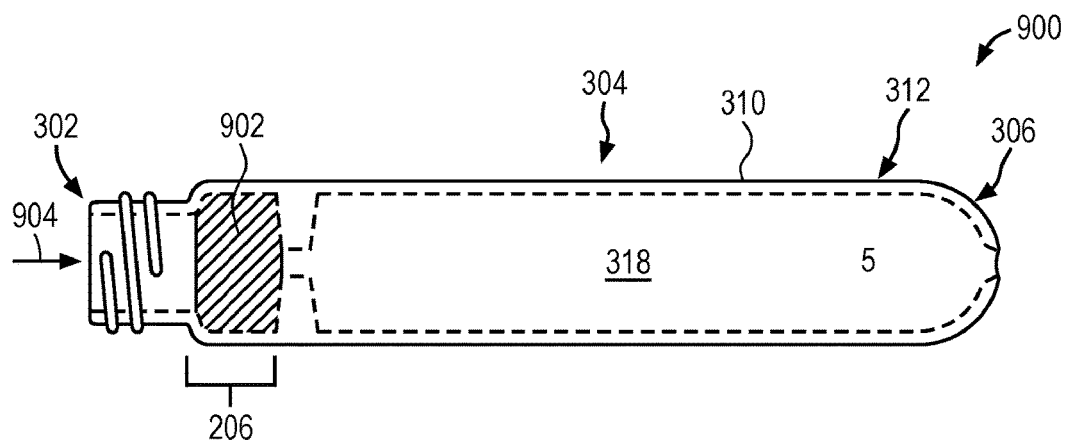
FIG. 9 illustrates the vial of FIG. 8 after the further processing operation of packing the vial with a substance to be smoked.

FIG. 9 illustrates the vial of FIG. 8 after the further processing operation of packing the vial with a substance to be smoked. Processing operation 900 may be an optional operation for packing a substance within vial 312. Representatively, in operation 900, the substance 902 may be inserted into the open first end 302 and packed into first chamber 206 by applying a pressure to the substance 902 in a direction of arrow 904. In one embodiment, the substance 902 may be packed using a tool, such as an arm with a flattened end that can press substance 902 within the first chamber 206. As previously discussed, the substance 902 may be any substance suitable for smoking out of a vial such as that disclosed herein, for example, tobacco, marijuana, or other similar substance.

Figure 10:
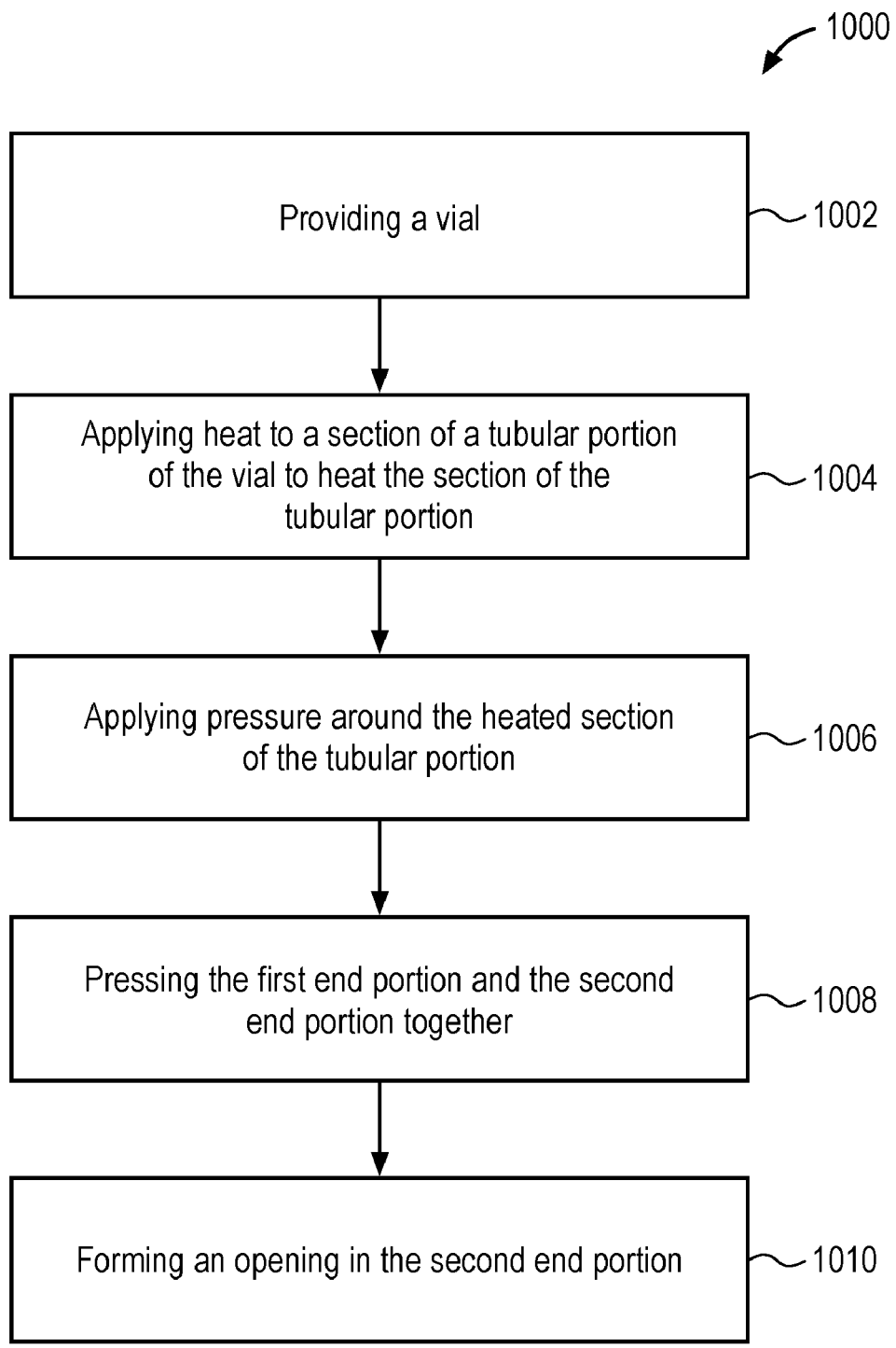
FIG. 10 illustrates a process for manufacturing a vial from which a substance may be smoked.

FIG. 10 illustrates a process for manufacturing a vial from which a substance may be smoked. Representatively, in one embodiment, process 1000 includes providing a glass vial (block 1002). The glass vial may be similar to the glass vial previously discussed in reference to FIG. 3. In this aspect, glass vial may include a first end portion and a second which are connected by a tubular portion having a hollow interior. The first end portion may be open and the second end portion may be closed. Next, heat may be applied to a desired section of the tubular portion (block 1004). The desired section of the tubular portion may be the section of the tubular portion outward to the area where an interior neck is desired, as previously discussed. A pressure is then applied around the heated section to collapse the heated section of the tubular portion into the hollow interior of the tubular portion (block 1006). Once the section is collapsed, the first end portion and the second end portion are pressed together until an exterior surface of the tubular portion surrounding the collapsed section is level with a remaining exterior surface of the tubular portion (block 1008). An opening may then be formed within the second end portion (block 1010). The opening may be formed, for example, by applying a fine point flame to the center of the second end and blowing air into the open first end until an opening is formed in the second end.

While certain embodiments have been described and shown in the accompanying drawings, it is to be understood that such embodiments are merely illustrative of and not restrictive on the broad invention. For example, although a glass vial for smoking is described herein, it is contemplated that the vial may be made of any non-flammable material that will hold its shape during a smoking operation. Representatively, the vial may be a made of another inflammable material such as a ceramic or insulated metal material. In addition, it should be understood that each of the processing operations disclosed herein may be performed by a single machine or a combination of machines, such that each of the steps are considered automated and capable of being performed without user intervention. Thus, the invention is not limited to the specific constructions and arrangements shown and described herein and various other modifications may occur to those of ordinary skill in the art.

What is claimed is:

1. A vial for packing a substance to be smoked from the vial, the vial comprising:
   an end chamber having an open end, the end chamber having a first inner diameter that is continuous in size to the open end;
   a receiving chamber extending from the end chamber, the receiving chamber is dimensioned to hold a substance therein and comprises a second inner diameter that is larger than the first inner diameter;
   an elongated vapor chamber extending from the receiving chamber, the elongated vapor chamber having an inhalation port for outputting a vapor from a substance within the receiving chamber, the elongated vapor chamber having a length greater than a length of the receiving chamber, the elongated vapor chamber having a third inner diameter that is equal to the second inner diameter and an outer surface with no grooves, recesses or other indentations; and
   a neck portion positioned between the receiving chamber and the elongated vapor chamber, the neck portion having a wall extending concentrically inward from an arcuate wall forming the receiving chamber and the elongated vapor chamber and having a neck opening that is axially aligned with the open end of the receiving chamber and the inhalation port of the elongated vapor chamber, wherein the neck opening and the inhalation port are substantially the same size, and wherein an exterior surface of the arcuate wall surrounding the neck portion is level with a remaining exterior surface of the arcuate wall forming the receiving chamber and the elongated vapor chamber.

2. The vial of claim 1 wherein a width of the neck portion is less than a length of the receiving chamber and the elongated vapor chamber.

3. The vial of claim 1 wherein the wall of the neck portion comprises a first side facing the receiving chamber and a second side facing the inhalation port, and wherein the first side forms a portion of the receiving chamber and the second side forms a portion of the elongated vapor chamber.

4. The vial of claim 1 wherein the receiving chamber, the elongated vapor chamber and the neck portion are integrally formed from a glass vial.

5. The vial of claim 1 wherein a screw threading is formed around an outer surface of the end chamber, wherein the screw threading is dimensioned to secure a cap to the open end of the end chamber.

6. A vial for packing a substance to be smoked from the vial, the vial comprising:
   a receiving chamber having a first portion and a second portion, the first portion having an open end dimensioned to receive a substance to be packed and the second portion dimensioned to hold the substance within the receiving chamber, wherein the first portion comprises an outer surface with screw threading and a first diameter that is smaller than a second diameter of the second portion;
   an elongated vapor chamber extending from the receiving chamber, the elongated vapor chamber having an inhalation port for outputting a vapor from a substance within the receiving chamber, the elongated vapor chamber having a length greater than the length of the receiving chamber and an outer surface with no grooves, recesses or other indentations; and
   a neck portion positioned between the receiving chamber and the elongated vapor chamber, the neck portion having a wall extending inward from an arcuate wall forming the receiving chamber and the elongated vapor chamber and having a neck opening that is in communication with the open end of the receiving chamber and the inhalation port of the elongated vapor chamber, wherein the diameter of the neck opening and the inhalation port are substantially the same.

7. The vial of claim 6 wherein the vapor chamber comprises a third diameter that is equal to the second diameter of the receiving chamber.

8. The vial of claim 6 wherein the second portion of the receiving chamber comprises an outer diameter that is equal to an outer diameter of the elongated vapor chamber along the entire length of the receiving chamber.

9. The vial of claim 6 wherein a width of the neck portion is less than a length of the receiving chamber and the elongated vapor chamber.

10. The vial of claim 6 wherein the wall of the neck portion comprises a first side facing the receiving chamber and a second side facing the inhalation port, and wherein the first side forms a portion of the receiving chamber and the second side forms a portion of the elongated vapor chamber.

11. The vial of claim 6 wherein the receiving chamber, the elongated vapor chamber and the neck portion are integrally formed from a glass vial.

12. The vial of claim 6 wherein the screw threading is dimensioned to secure a cap to the open end of the end chamber.

* * * * *